Sept. 18, 1945.         S. J. PALFREY         2,385,024
                      AIRCRAFT GUN MOUNTING
                      Filed March 18, 1943      5 Sheets-Sheet 3
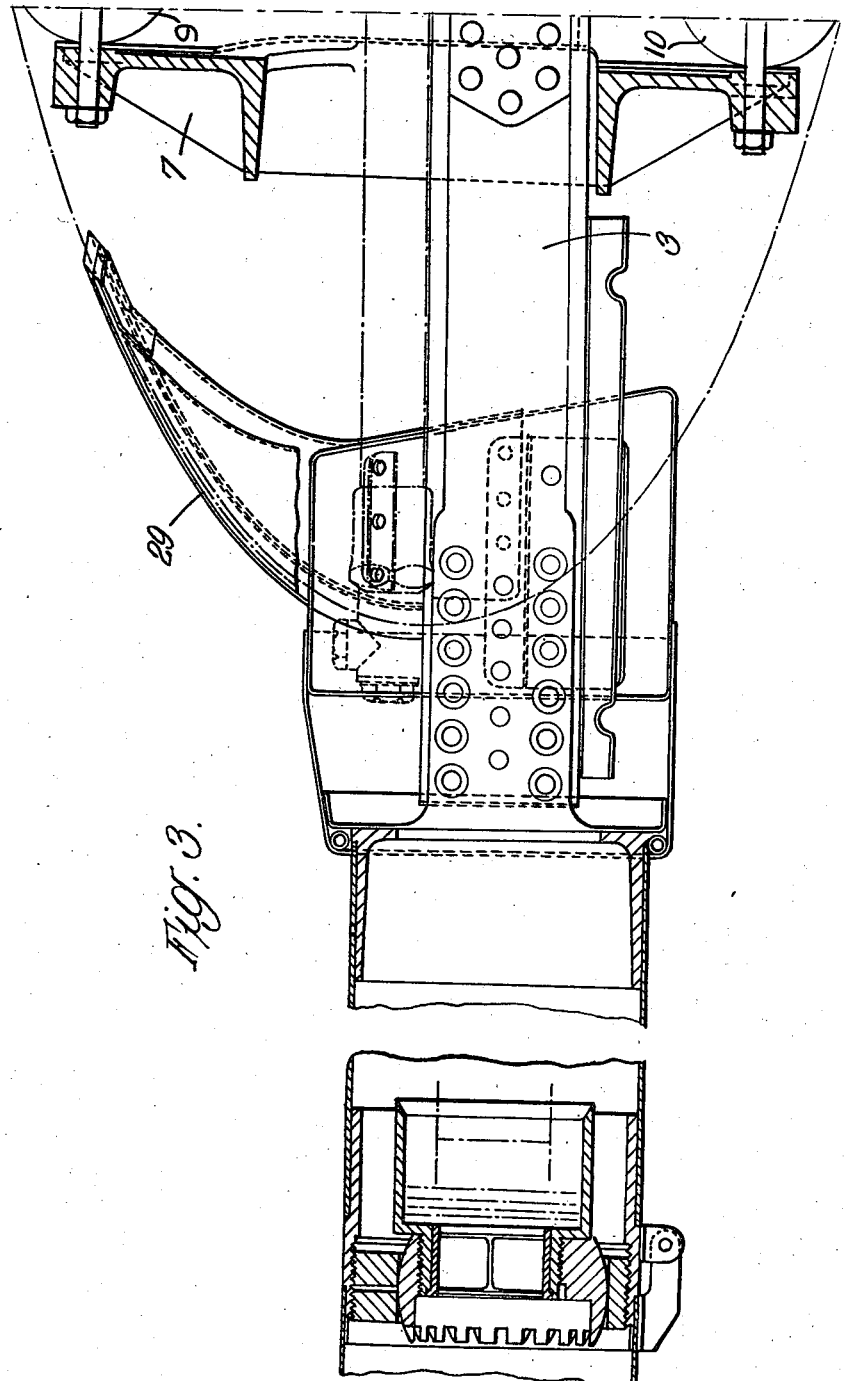

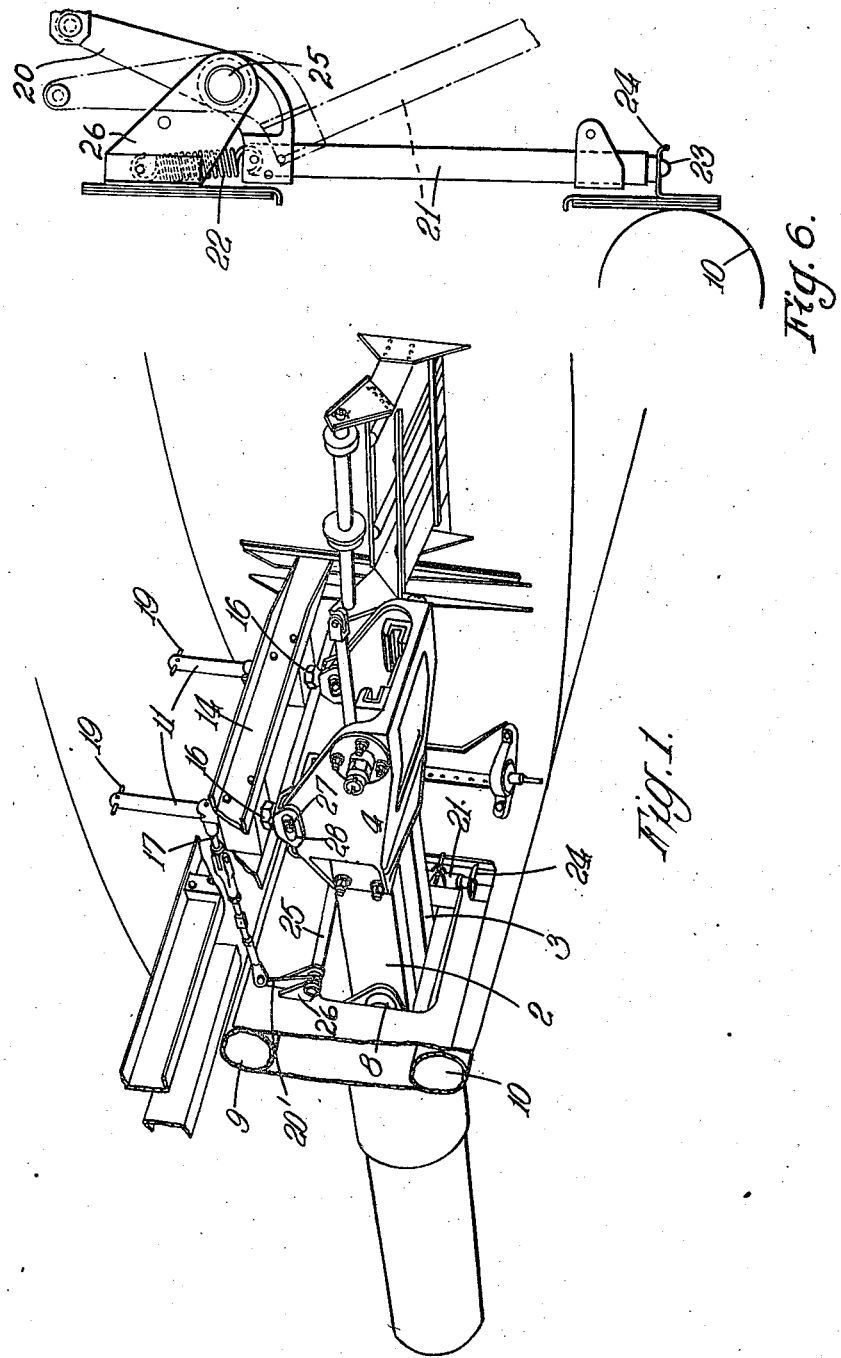

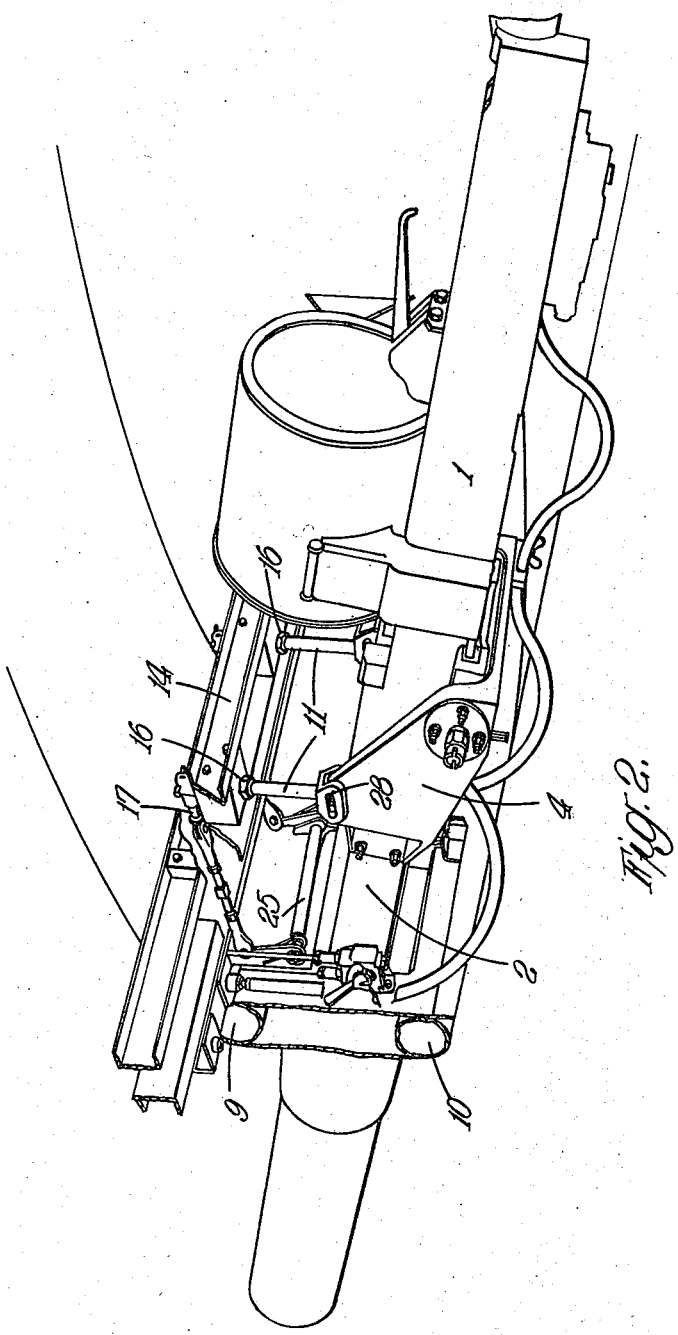

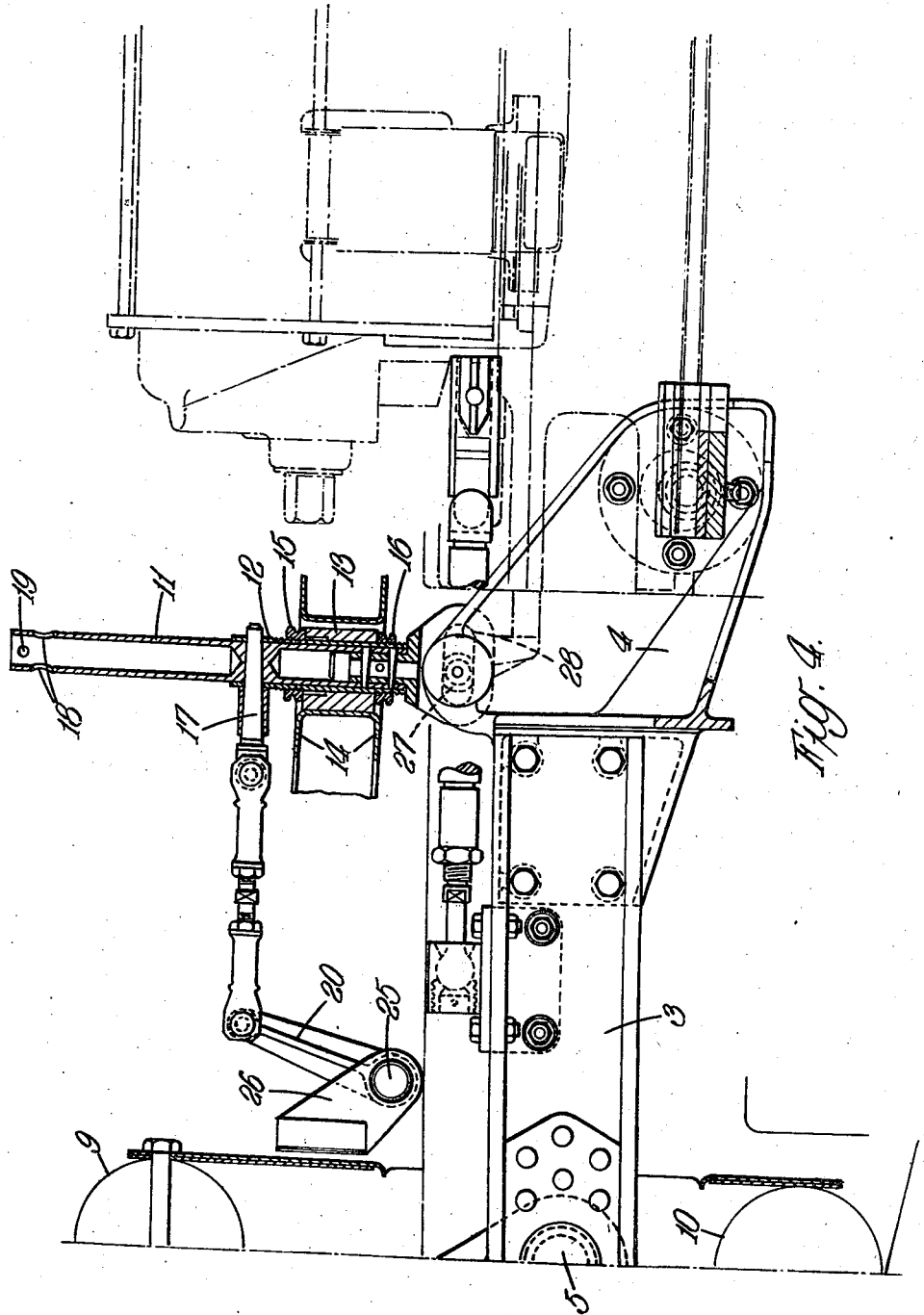

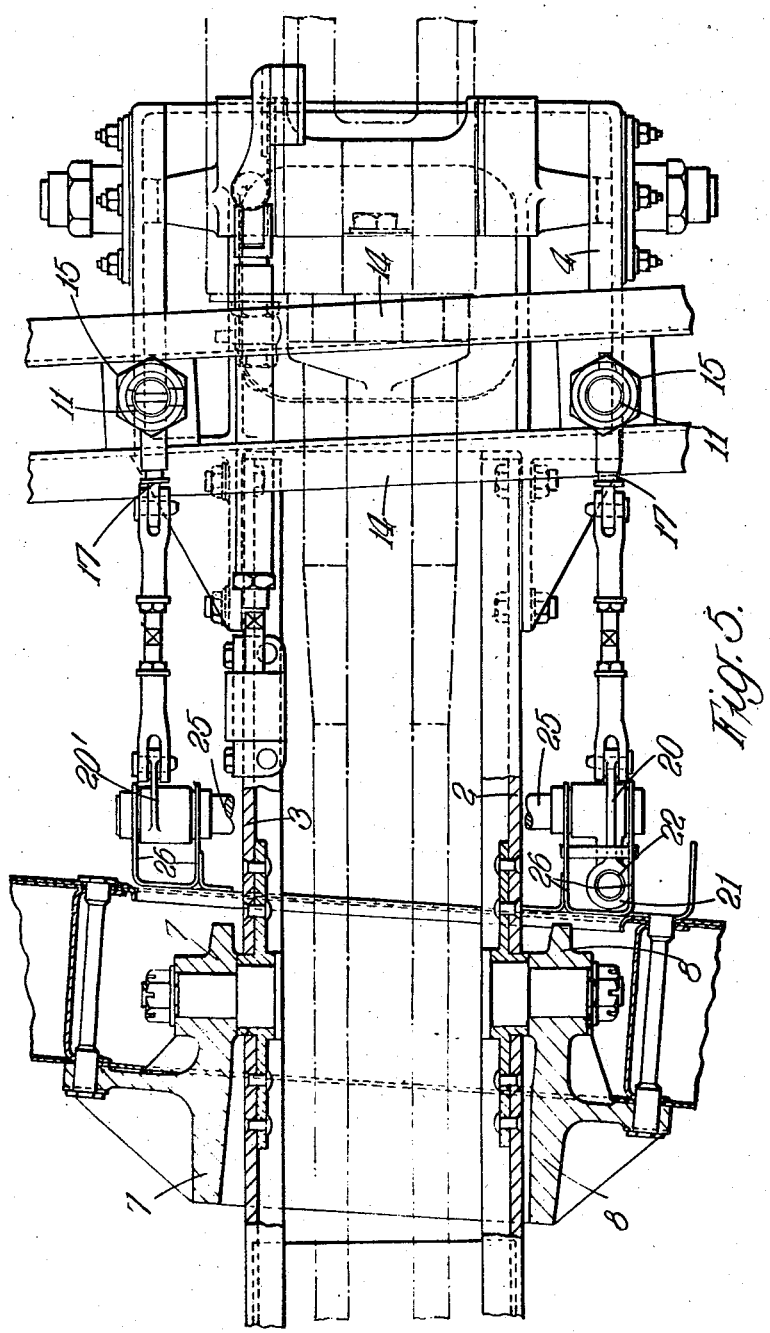

Patented Sept. 18, 1945

2,385,024

UNITED STATES PATENT OFFICE 2,385,024

AIRCRAFT GUN MOUNTING

Sydney James Palfrey, Swanland, England, assignor to Blackburn Aircraft Limited, Brough, England Application March 18, 1943, Serial No. 479,580
In Great Britain January 12, 1942

8 Claims. (Cl. 89—37.5)

This invention relates to improvements in mountings for automatic weapons and is concerned with such mountings for supporting fixed guns in aircraft or other enclosed spaces.

An object of the present invention is to provide a mounting such that the gun may be displaced from its normal fixed firing position into a position in which it is readily accessible for servicing, cleaning or repair.

According to the present invention the gun is supported by a cradle or the like which is secured to the aircraft or other vehicle at two points about one of which the cradle may pivot whilst the other point is capable of axial displacement to permit the gun to be swung from normal operative position to an accessible position. Preferably there are two aligned pivot points and two axially displaceable points under common control to give strength and rigidity.

Further according to the present invention the aperture in the wing, fuselage or the other surface through which the barrel of the gun (and possibly also its cradle) projects is covered by a louvre which is displaceable with the gun. The joint between the edges of the louvre and fuselage, wing or the other surface is sealed by a rubber packing.

Access to the gun is obtained by removing a displaceable panel, opening a door, or similar operation, whereafter latching means normally retaining the axially movable securing point or points are released to permit displacement thereof and consequent swinging of the cradle or the like to bring the gun to accessible position. The axially displaceable support points preferably have limited extents of movement.

Now in order that the invention may be clearly understood and readily carried into effect, an embodiment thereof is hereinafter more fully described with reference to the accompanying drawings which are given for purposes of illustration only and not of limitation.

In these drawings:

Figure 1 is a three-quarter rear view of the gun supporting cradle and its attachment points shown in an aeroplane wing of which parts are omitted for clarity, Figure 2 is a view similar to Figure 1 showing the gun on its cradle with the latter in its alternative or accessible position, Figure 3 is a side sectional view forwardly of the pivot point, whilst Figure 4 is a side sectional view rearwardly of that pivot point, Figure 5 is a plan sectional view, and Figure 6 is a side view of the latching means shown in normal position in full line and in adjusted position in chain line.

Referring now to the said drawings, the gun indicated as a whole by the reference numeral 1 is mounted for free recoil movement on a cradle comprising a pair of side members 2, 3 joined at their rear end by a member 4. At points intermediate the length of the members 2 and 3 are pivots 5, 6 journalled in brackets 7, 8 mounted on some convenient fixed part of the aircraft or other vehicle, for example to spars 9, 10 of a wing in the example illustrated. These pivots constitute one of the main points of attachment of the gun supporting cradle and serve also as the pivot to permit angular displacement thereof to bring the gun into accessible position.

The second point of attachment is capable of axial displacement from normal position to the accessible position and conveniently comprises a tube 11 which engages the member 4 of the cradle and is arranged to slide in a sleeve 12 which is mounted in a bush 13 made fast to some convenient stationary part of the aircraft or other structure or to a supporting bracket 14 carried thereby. The sleeve 12 is adjustable in the bush 13 accurately to position the gun 1 in its fixed firing position and this movement is controlled by providing the sleeve with an external thread with which mesh adjusting and locking nuts 15, 16 situated respectively at opposite sides of the sleeve (see Figure 4). The tube 11 is in its normal or operative position locked against movement within the sleeve by a detent or equivalent member 17 which extends through the wall of the sleeve 12 and tubular member 11 (Figure 4). This detent member 17 is spring loaded to tend to enter through the aperture provided in the tube 11 and is positively withdrawn as more fully described later. When the detent member 17 is withdrawn the tube 11 can slide in the sleeve 12. The extent of this sliding movement may be limited by the detent member re-engaging the tubular member by entering apertures 18 provided near the free end thereof. As an alternative or as an additional precaution against the tube separating from the sleeve 12 a protuberance conveniently in the form of a cross bar 19 passes through the end of the tube 11 such that the protuberance or cross bar 19 will contact the sleeve 12 and prevent the tube 11 separating therefrom.

The detent member 17 is connected to a lever 20 to which in turn is made fast a manually operable handle 21. A spring 22 is provided and arranged to exert its force to restrain the handle 21 from leaving its normal position and it is this spring which loads the detent member 17. The handle 21 is normally locked to prevent accidental operation thereof which might release the detent member 17 and this locking is conveniently effected by means of a spring loaded detent 23 passing through an aperture in a plate 24. This arrangement is such that when it is desired to swing the cradle from normal or operative position into accessible position the handle 21 is gripped by hand and the detent 23 is lifted digitally to enable it to leave the hole in the plate 24. The handle 21 may now be rocked, so rocking the lever 20 and withdrawing the detent member 17 from engagement with the tube 11 which now commences to slide in the sleeve 12 to allow the gun supporting cradle to rock. When this movement of the cradle commences, the operator releases the handle 21 and on the tube 11 reaching its limit division, the detent member 17 will engage in the holes 18 to latch the gun carriage in its lower position. Should the detent member for any reason fail to engage the holes 18 or should the operator omit to release the handle 21 excessive displacement of the cradle will not occur as the movement of the tube 11 is prevented by the protuberance or cross bar 19 already described.

In the installation illustrated there are two aligned pivot points and two axially movable points. The two levers 20 are made fast to a common shaft 25 which is journalled in brackets 26. The one lever 20 is a double arm lever as illustrated in Figure 6, whilst the other lever 20¹ need only be a single arm lever as may be seen from Figure 4. In this way the operation of the handle 21 withdraws both detent members 17 to permit simultaneous movement of the two tubes 11. To adapt the straight line movement of the tube 11 to the arcuate movement of the member 4 of the cradle the connection of the tube thereto is through a roller 27 acting in a slot 28 as may be seen in Figure 4.

Where the barrel of the gun and in some cases also the ends of the cradle members 2, 3 project through the fuselage or other part of the aircraft or other vehicle for example the wing as illustrated, a curved plate or louvre 29 is provided on the projecting portion and adapted to cover the opening. This louvre 29 is so mounted that on displacement of the gun 1 and its cradle it will be displaced over the outer surface of the wing, fuselage or other part. A rubber packing is provided at the edges of the louvre 29 to seal the same onto the surface of the wing or the like. A fairing may be provided over the projecting portion of the gun or the gun and its cradle and this fairing will naturally move with the gun on displacement thereof.

Access to the gun may be obtained through a cover plate (not shown) which may be removed, or through a doorway which may be opened to permit the operator to reach the handle 21 and bring about displacement of the cradle to give him access to the gun which on being rocked is brought from an inaccessible position in which it is fired, into an accessible position for cleaning, repair, replacement, re-loading and such like servicing operations thereon.

The cradle above described and illustrated in the drawings is suitable for a variety of automatic guns but it is to be understood that the invention is not limited to any particular form of cradle since cradles adapted for different kinds of fixed guns may be installed in aircraft or other vehicles in the manner described above. Furthermore the pivoting of the cradle may take place about an axis which is vertical, horizontal or otherwise disposed.

I claim:

1. An aircraft mounting for a gun or the like comprising a cradle mounted in the aircraft structure for supporting the gun, two aligned pivots about which the cradle is adapted to swing, two elongated members movable in the direction of their length and in a direction transverse of the axis about which the cradle is pivoted, said members being connected to the cradle for supporting the cradle in different positions relative to the aligned pivots, separate means for latching the elongated members in different positions, and means under a common control for operating the latching means for both elongated members.

2. An aircraft mounting for a gun or the like comprising a cradle mounted in the aircraft structure for supporting the gun, pivotal means supporting the cradle from said structure, an elongated member movable in the direction of its length and in a direction transverse of the axis about which the cradle is pivoted, said elongated member being carried by said structure, a pin-and-slot connection between the elongated member and the cradle at a point spaced from said pivotal supporting means, and latching means for preventing lengthwise movement of said elongated member and movement of the cradle about the pivotal supporting means.

3. An aircraft mounting for a gun or the like comprising a cradle mounted in the aircraft structure for supporting the gun, a pair of aligned pivots forming one support for the cradle, an elongated member movable in the direction of its length and in a direction transverse of the axis about which the cradle is pivoted, said elongated member being connected to the cradle by a pin-and-slot connection and forming a second support for the cradle, a sleeve in which said member is slidable lengthwise, and latching means normally locking said member against sliding movement in said sleeve.

4. An aircraft mounting for a gun or the like comprising a cradle mounted in the aircraft structure for supporting the gun, pivotal means for supporting the cradle from said structure, a pair of sleeves carried by said structure and extending in a direction transverse of the axis about which the cradle is pivoted, an elongated member slidable lengthwise in each sleeve and connected to the cradle at a point spaced from the pivotal supporting means to form a second support for the cradle, the connections between said elongated members and the cradle being constructed and arranged to compensate for the linear movement of the elongated members with respect to the arcuate movement of the cradle when the cradle is swung on its pivotal supporting means, separate means latching each of said members in a position which locks the cradle against movement relative to its pivotal supporting means, a common control for operating the latching means for both elongated members, and means for preventing unintentional sliding of said elongated members completely out of the sleeves.

5. An aircraft mounting for a gun or the like comprising a cradle mounted in the aircraft structure for supporting the gun, pivotal means for supporting the cradle from the supporting structure, a pair of sleeves carried by said structure and extending in a direction transverse of the axis about which the cradle is pivoted, an elongated member slidable lengthwise in each sleeve and extending beyond the sleeve at both ends, one end of each elongated member being connected to the cradle at a point spaced from the pivotal supporting means to form a second support for the cradle, the connections between said ends of the elongated members and the cradle being constructed and arranged to compensate for the linear movement of the elongated members with respect to the arcuate movement of the cradle when the cradle is swung on its pivotal supporting means, means carried by said elongated members adjacent their other ends for preventing unintentional sliding of the members completely out of the sleeves, separate means for latching each of said elongated members in a position relative to said sleeve which locks the cradle against movement relative to its pivotal supporting means, and means under a common control for operating the latching means for both elongated members.

6. An aircraft mounting for a gun or the like comprising a cradle mounted in the aircraft structure for supporting the gun, pivotal means supporting the cradle from said structure, a pair of sleeves carried by said structure and extending in a direction transverse of the axis about which the cradle is pivoted, an elongated member slidable lengthwise in each sleeve and connected to the cradle at a point spaced from the pivotal supporting means to form a second support for the cradle, a spring-loaded element movable transversely of each of said elongated members and constructed and arranged to engage a portion of the respective elongated members to hold them in a predetermined position, and a common manually-operable means for retracting the spring-loaded elements from both elongated members to free them for sliding movement in their respective sleeves.

7. An aircraft mounting for a gun or the like comprising a cradle mounted in the aircraft structure for supporting the gun, a pair of aligned pivots pivotally supporting the cradle from said structure and forming one support for the cradle, a pair of sleeves carried by said structure and extending in a direction transverse of the axis about which the cradle is pivoted, means for adjustably positioning said sleeves lengthwise relative to said structure, an elongated member slidable lengthwise within each sleeve and connected to the cradle, the connections between the elongated members and the cradle being constructed and arranged to compensate for the linear movement of the elongated members with respect to the arcuate movement of the cradle when the cradle is swung on its pivotal supporting means, separate latching means normally latching each elongated member against sliding movement in its sleeve, and means under a common control for operating the latching means for both elongated members.

8. An aircraft mounting for a gun or the like comprising a cradle mounted in the aircraft structure for supporting the gun, pivotal means supporting the cradle from said structure, a sleeve carried by said structure and extending in a direction transverse to the axis about which the cradle is pivoted, means for axially adjusting the sleeve relative to said structure, an elongated member slidable in said sleeve and connected to the cradle at a point spaced from the pivotal supporting means to form a second support for the cradle, a spring-loaded element movable transverse to said elongated member and constructed and arranged to engage a portion thereof to hold it in a predetermined position, manually-operable rockable means for retracting the spring-loaded element to free the elongated member for slidable movement in the sleeve, and manually-releasable latching means for holding said rockable means.

S. J. PALFREY.